(12) United States Patent
Chen

(10) Patent No.: US 11,878,589 B2
(45) Date of Patent: Jan. 23, 2024

(54) HYBRID ALL-TERRAIN VEHICLE

(71) Applicant: SEGWAY TECHNOLOGY CO., LTD., Changzhou (CN)

(72) Inventor: Mingtang Chen, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 42 days.

(21) Appl. No.: 17/692,690

(22) Filed: Mar. 11, 2022

(65) Prior Publication Data

US 2022/0289015 A1 Sep. 15, 2022

(30) Foreign Application Priority Data

Mar. 15, 2021 (CN) .......................... 202120537513.1

(51) Int. Cl.
*B60K 6/40* (2007.10)
*B60K 6/52* (2007.10)
*B60K 6/48* (2007.10)

(52) U.S. Cl.
CPC .................. *B60K 6/52* (2013.01); *B60K 6/40* (2013.01); *B60K 6/48* (2013.01); *B60K 2006/4825* (2013.01); *B60Y 2200/20* (2013.01)

(58) Field of Classification Search
CPC .. Y02T 10/62; B60K 6/48; B60K 2006/4825; B60K 1/00; B60K 6/00; B60K 2006/4816; B60K 2006/4808; B60K 6/52; B60K 6/485; B60K 6/24; B60K 6/40; B60K 2001/0416; B60W 10/08; B60W 20/00; B60Y 2200/92; B60Y 2200/20; B60Y 2200/12
See application file for complete search history.

(56) References Cited

U.S. PATENT DOCUMENTS

| | | | | |
|---|---|---|---|---|
| 9,038,754 | B2 | 5/2015 | Takagi | |
| 9,545,838 | B1* | 1/2017 | Hill | B60K 17/342 |
| 11,667,183 | B2* | 6/2023 | Hoppe | B60K 6/365 |
| | | | | 475/5 |
| 2013/0075183 | A1* | 3/2013 | Kochidomari | B60K 17/043 |
| | | | | 477/3 |
| 2015/0224981 | A1* | 8/2015 | Fujishiro | B60W 20/13 |
| | | | | 180/65.265 |

(Continued)

FOREIGN PATENT DOCUMENTS

| | | | | | |
|---|---|---|---|---|---|
| CN | 1618644 | A | * | 5/2005 | B60K 6/365 |
| CN | 102029886 | A | * | 4/2011 | B60K 6/442 |

(Continued)

*Primary Examiner* — George C Jin
*Assistant Examiner* — Teuta B Holbrook
(74) *Attorney, Agent, or Firm* — Frost Brown Todd LLP

(57) ABSTRACT

A hybrid all-terrain vehicle includes a vehicle frame; a front wheel coupled to a front part of the vehicle frame; a rear wheel coupled to a rear part of the vehicle frame; a drive motor arranged on the vehicle frame; an engine assembly arranged on the vehicle frame and providing electric energy to the drive motor, the engine assembly including a crankshaft, and an axis of the crankshaft being perpendicular to a longitudinal centrosymmetric plane of the hybrid all-terrain vehicle; and a drive shaft extending along a front-rear direction of the vehicle frame and drivingly coupled to the drive motor to transmit a driving force of the drive motor to the front wheel or the rear wheel.

16 Claims, 2 Drawing Sheets

(56) References Cited

U.S. PATENT DOCUMENTS

| | | | |
|---|---|---|---|
| 2016/0052382 A1* | 2/2016 | Clark | B60W 20/40 |
| | | | 180/65.265 |
| 2016/0176457 A1* | 6/2016 | de Haan | B60N 2/005 |
| | | | 180/215 |
| 2018/0118012 A1* | 5/2018 | Wilton | F16H 3/78 |
| 2019/0070947 A1* | 3/2019 | Aikawa | F16H 57/0441 |
| 2019/0145500 A1* | 5/2019 | Littlefield | B60K 6/365 |
| | | | 475/275 |
| 2020/0108709 A1* | 4/2020 | Kohler | B60K 6/46 |

FOREIGN PATENT DOCUMENTS

| | | | | |
|---|---|---|---|---|
| CN | 103370221 A | | 10/2013 | |
| CN | 205243696 U | * | 5/2016 | B60K 5/04 |
| CN | 106029425 B | * | 8/2018 | B60K 17/344 |
| CN | 108407600 A | * | 8/2018 | B60K 1/04 |
| CN | 208789484 U | * | 4/2019 | B60K 6/543 |
| CN | 109774450 A | * | 5/2019 | B60K 1/00 |
| CN | 111204211 A | * | 5/2020 | B60K 17/3462 |
| CN | 111376744 A | | 7/2020 | |
| CN | 111717013 A | | 9/2020 | |
| CN | 211519234 U | | 9/2020 | |
| CN | 214728144 U | | 11/2021 | |
| DE | 112018002094 T5 | * | 1/2020 | B60K 6/24 |
| DE | 102019117758 A1 | * | 1/2021 | B60K 6/365 |
| JP | 2021-028181 A | | 2/2021 | |
| KR | 20130020517 A | * | 2/2013 | B60W 20/00 |
| KR | 20170027062 A | * | 3/2017 | B60W 10/08 |
| WO | WO-2019082256 A1 | * | 5/2019 | |
| WO | WO-2020211892 A1 | * | 10/2020 | B60K 6/36 |
| WO | WO-2020211894 A1 | * | 10/2020 | B60K 20/02 |
| WO | WO-2020240736 A1 | * | 12/2020 | B60K 1/00 |

* cited by examiner

HYBRID ALL-TERRAIN VEHICLE

CROSS-REFERENCE TO RELATED APPLICATIONS

The present disclosure is based on and claims priority to Chinese Patent Application No. 202120537513.1 filed on Mar. 15, 2021, the entire contents of which are incorporated herein by reference.

FIELD

The present disclosure relates to the field of all-terrain vehicles and, more particularly, to a hybrid all-terrain vehicle.

BACKGROUND

All-terrain vehicles in the related art are usually fuel-driven or hybrid-driven, which are relatively environmentally unfriendly to use and less competitive in the market, and the cost of using fuel-driven vehicles is high.

SUMMARY

A hybrid all-terrain vehicle according to embodiments of the present disclosure includes: a vehicle frame; a front wheel coupled to a front part of the vehicle frame; a rear wheel coupled to a rear part of the vehicle frame; a drive motor arranged on the vehicle frame; an engine assembly arranged on the vehicle frame and providing electric energy to the drive motor, the engine assembly including a crankshaft, and an axis of the crankshaft being perpendicular to a longitudinal centrosymmetric plane of the hybrid all-terrain vehicle; and a drive shaft extending along a front-rear direction of the vehicle frame and drivingly coupled to the drive motor to transmit a driving force of the drive motor to the front wheel or the rear wheel.

A hybrid all-terrain vehicle according to other embodiments of the present disclosure includes: an engine and an electric generator being operatively coupled as an engine assembly; and a drive motor and a gearbox being operatively coupled as an electric drive assembly.

BRIEF DESCRIPTION OF DRAWINGS

These and/or other aspects and advantages of embodiments of the present disclosure will become apparent and more readily appreciated from the following descriptions made with reference to the drawings, in which.

DETAILED DESCRIPTION OF EMBODIMENTS

Figure 1:
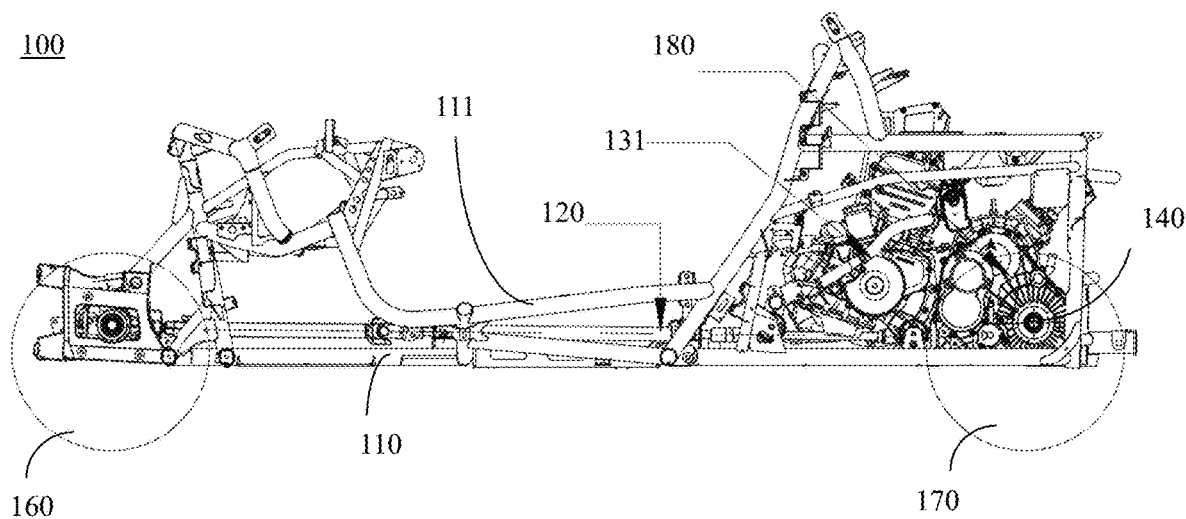
FIG. 1 is a schematic view of a hybrid all-terrain vehicle according to an embodiment of the present disclosure.

Embodiments of the present disclosure will be described in detail below. The embodiments described below with reference to the accompanying drawings are exemplary.

A hybrid all-terrain vehicle 100 according to embodiments of the present disclosure will be described below with reference to FIGS. 1-2. The hybrid all-terrain vehicle 100 includes: a vehicle frame 110, a front wheel 160, a rear wheel 170, a drive motor 140, an engine assembly 130, and a drive shaft 120.

In some embodiments, the front wheel is coupled to a front part of the vehicle frame 110 and the rear wheel is coupled to a rear part of the vehicle frame 110. The drive motor 140 is arranged on the vehicle frame 110. The engine assembly 130 is arranged on the vehicle frame 110 and provides electric energy to the drive motor 140. The engine assembly 130 includes a crankshaft having an axis 133 perpendicular to a longitudinal centrosymmetric plane 150 of the hybrid all-terrain vehicle 100. The drive shaft 120 extends along a front-rear direction of the vehicle frame 110 and is drivingly coupled to the drive motor 140 to transmit a driving force of the drive motor 140 to the front wheel or the rear wheel.

It can be understood that not all straddle-type all-terrain vehicles have a cockpit, and the present solution is applicable to three types of all-terrain vehicles. Although all-terrain vehicles having the cockpit are mentioned in the description of the present solution, the application of the present solution to other all-terrain vehicles without any cockpit can be simply deduced by those skilled in the art and hence also fall into the protection scope of the present solution, which will not be repeated here.

The engine assembly 130 is configured to provide electric drive to drive the drive motor 140 to rotate. The power of the drive motor 140 can be transferred to the front wheel or the rear wheel through the drive shaft 120 to drive the all-terrain vehicle 100 to travel.

For the hybrid all-terrain vehicle 100 according to the embodiments of the present disclosure, by arranging the engine assembly 130 and the drive motor 140 on the vehicle frame 110, the engine assembly 130 can provide electric power to enable the drive motor 140 to operate, so that the hybrid all-terrain vehicle 100 can be electrically driven, allowing the hybrid all-terrain vehicle 100 to be used more environmentally friendly and become more competitive in the market.

Figure 2:
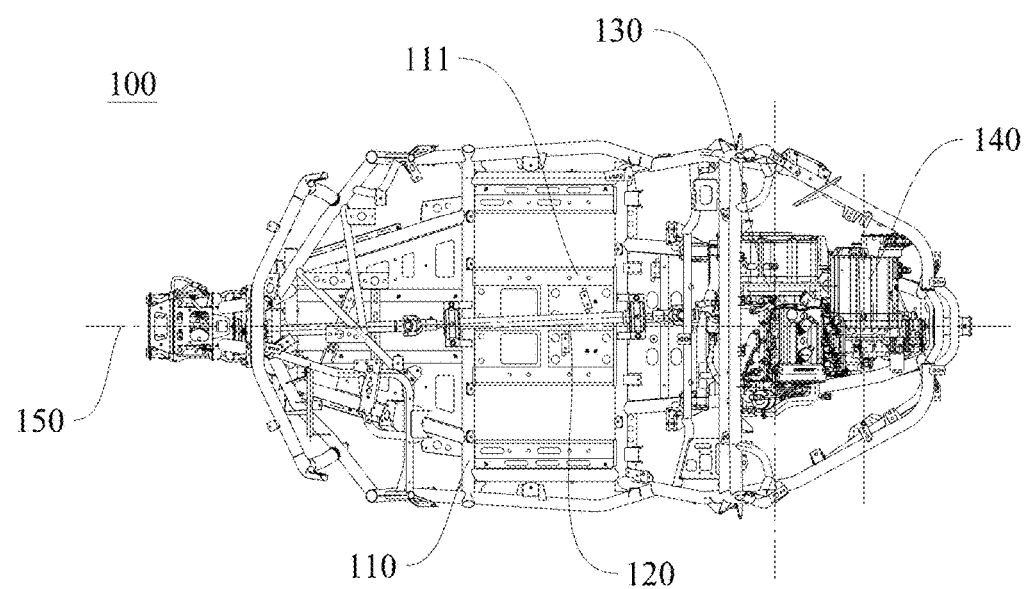
FIG. 2 is a schematic view of a hybrid all-terrain vehicle according to an embodiment of the present disclosure.
Figure 3:
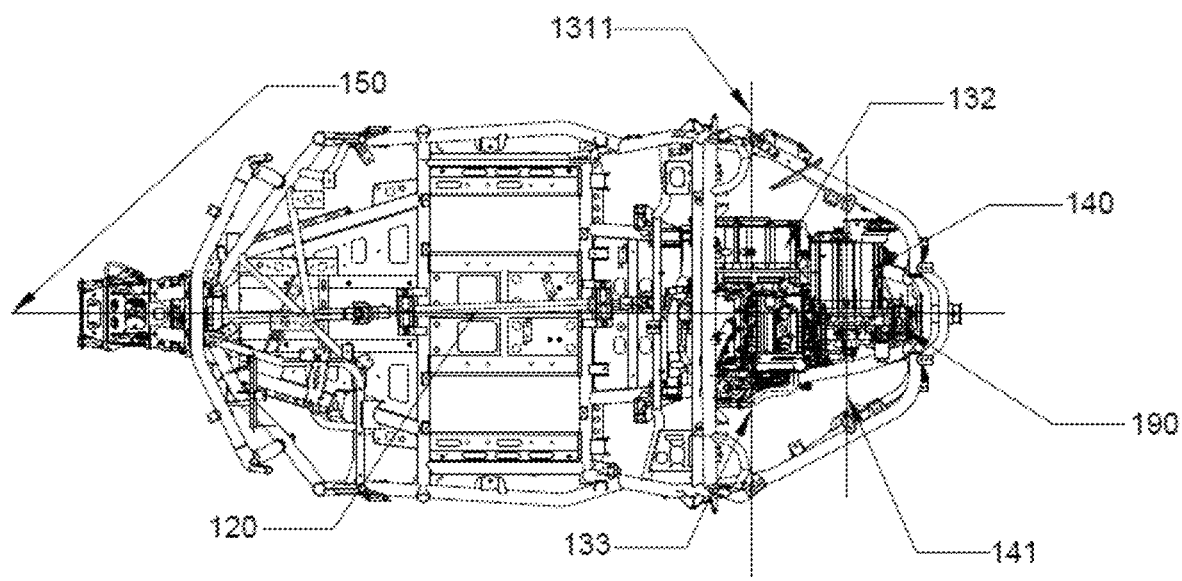
FIG. 3 is a schematic view of a hybrid all-terrain vehicle according to an embodiment of the present disclosure.

As shown in FIGS. 1 and 2, in some embodiments, an axis 141 of the drive motor 140 is perpendicular to the longitudinal centrosymmetric plane 150. In this way, the power of the drive motor 140 is in the same straight line as a traveling direction of the hybrid all-terrain vehicle 100, reducing loss in the power transmission process and improving the efficiency of the electric drive, to lower the cost to use the hybrid all-terrain vehicle 100.

As shown in FIGS. 1 and 2, in some embodiments, the engine assembly 130 is located on a front side of the drive motor 140. It can be appreciated that the drive motor 140 is located on a rear side of the engine assembly 130 and the drive motor 140 is closer to the rear wheel of the hybrid all-terrain vehicle 100, so that the power can be transferred to the wheels of the hybrid all-terrain vehicle 100 more quickly, allowing for improved performance of the hybrid all-terrain vehicle 100.

As shown in FIGS. 1 and 2, in some embodiments, the engine assembly 130 and the drive motor 140 are located at the rear part of the vehicle frame 110. It should be noted that the hybrid all-terrain vehicle 100 usually has a cockpit 111, and the cockpit 111 is usually located at the rear part of the vehicle frame 110, allowing for a larger space at the rear part of the vehicle frame 110. As a result, the engine assembly 130 and drive motor 140 can be sandwiched at the rear part of the vehicle frame 110, making the operation of the engine assembly 130 and the drive motor 140 safe and reliable to improve the use performance of the hybrid all-terrain vehicle 100, and making the structure of the hybrid all-terrain vehicle 100 more compact to reduce the volume of the hybrid all-terrain vehicle 100 and improve the market competitiveness of the hybrid all-terrain vehicle 100.

As shown in FIG. 1, in some embodiments, an axis of the drive shaft 120 is at an angle to the longitudinal centrosymmetric plane 150. In this way, during the operation of the drive shaft 120, a transmission direction of the driving force is adjusted, so that the driving force can better drive the front wheel or the rear wheel to rotate, improving the performance of the hybrid all-terrain vehicle 100. Moreover, the angle between the axis of the drive shaft 120 and the longitudinal centrosymmetric plane 150 can reduce the loss of power in the transmission process and improve the operation efficiency of the hybrid all-terrain vehicle.

In some embodiments, the axis 141 of the drive motor 140 and the axis 133 of the crankshaft are both located above the drive shaft 120. A vertical distance between an axis 1311 of an engine 131 of the engine assembly 130 and the axis of the drive shaft 120 is L1, and a vertical distance between the axis 141 of the drive motor 140 and the axis of the drive shaft 120 is L2, in which L1>L2. It can be understood that the drive motor 140 is closer to the drive shaft 120, enabling the power of the drive motor 140 to be transmitted to the drive shaft 120 more quickly, and enhancing the performance of the hybrid all-terrain vehicle 100.

In some embodiments, a gearbox 190 is arranged between the drive motor 140 and the drive shaft 120, and the gearbox 190 and the drive motor 140 are operatively coupled and form an electric drive assembly 180. It can be appreciated that the gearbox 190 is used for rotation speed adjustment, to make the operation of the drive motor 140 more stable and reliable, and power can be better transferred to the drive shaft 120 to make the operation of the drive shaft 120 more stable and reliable. Further, the gearbox 190 can be integrated into the drive motor 140 to make the structure of the all-terrain vehicle 100 more compact.

As shown in FIG. 2, in some embodiments, the longitudinal centrosymmetric plane 150 passes through a middle part of the drive motor 140 and/or a middle part of the engine assembly 130. In this way, the drive motor 140 is in the same plane as the longitudinal centrosymmetric plane 150, allowing for more balanced transfer of power from the drive motor 140 to the drive shaft 120, and enhancing the performance of the all-terrain vehicle 100.

Further, the longitudinal centrosymmetric plane 150 passes through the middle part of the engine assembly 130. It can be appreciated that the middle part of the engine assembly 130 is in the same plane as the longitudinal centrosymmetric plane 150. As a result, the engine assembly 130 is in the same plane as the drive motor 140, allowing the drive motor 140 to better receive the electric drive from the engine assembly 130, improving the performance of the drive motor 140 and prolonging the service life of the drive motor 140.

In some embodiments, the engine assembly 130 includes an engine 131 and an electric generator 132. The electric generator 132 includes a generator shaft. The crankshaft is arranged in the engine 131, and the crankshaft is drivingly coupled to the generator shaft to drive the electric generator 132 to generate electric energy. An axis of the generator shaft is parallel or perpendicular to the longitudinal centrosymmetric plane 150. It can be appreciated that the engine 131 is configured to drive the electric generator 132 to rotate, thereby generating electric power to rotate the drive motor 140, and enabling the hybrid all-terrain vehicle 100 to operate for use.

As shown in FIGS. 1 and 2, in some embodiments, the hybrid all-terrain vehicle 100 includes a cockpit 111 located in a middle part of the hybrid all-terrain vehicle 100, and the engine assembly 130 and the drive motor 140 are located in rear of the cockpit 111. In this way, the cockpit 111 can make it convenient for a user to drive the hybrid all-terrain vehicle 100, enhancing the use performance of the hybrid all-terrain vehicle 100, and the cockpit 111 can improve the comfort of driving the hybrid all-terrain vehicle 100, enhancing the market competitiveness of the hybrid all-terrain vehicle 100.

In the description of the present disclosure, it is to be understood that terms such as "central," "longitudinal," "transverse," "length," "width," "thickness," "upper," "lower," "front," "rear," "left," "right," "vertical," "horizontal," "top," "bottom," "inner," "outer" "clockwise," "counterclockwise," "axial," "radial" and "circumferential" should be construed to refer to the orientation as shown in the drawings. These relative terms are for convenience and simplicity of description and do not indicate or imply that the present disclosure have a particular orientation or be constructed and operated in a particular orientation. Thus, these terms shall not be construed to limit the present disclosure.

Other configurations and operations of the all-terrain vehicle 100 according to the embodiments of the present disclosure are known to those skilled in the art and will not be elaborated herein.

In the present disclosure, reference throughout this specification to "an embodiment," "some embodiments," "an exemplary embodiment," "an example," "a specific example" or "some examples" means that a particular feature, structure, material, or characteristic described in connection with the embodiment or example is included in at least one embodiment or example of the present disclosure. In the specification, the appearances of the above terms are not necessarily referring to the same embodiment or example.

Although embodiments of the present disclosure have been shown and illustrated, it shall be understood by those skilled in the art that various changes, modifications, alternatives and variations can be made in the embodiments without departing from the principle and purpose of the present disclosure. The scope of the present disclosure is defined by the claims and their equivalents.

The invention claimed is:

1. A hybrid all-terrain vehicle, comprising:
a vehicle frame;
a front wheel coupled to a front part of the vehicle frame;
a rear wheel coupled to a rear part of the vehicle frame;
a drive motor arranged on the vehicle frame;
an engine assembly arranged on the vehicle frame and providing electric energy to the drive motor, the engine assembly comprising a crankshaft, and an axis of the crankshaft being perpendicular to a longitudinal centrosymmetric plane of the hybrid all-terrain vehicle; and
a drive shaft extending along a front-rear direction of the vehicle frame and drivingly coupled to the drive motor to transmit a driving force of the drive motor to the front wheel or the rear wheel,
wherein:
the engine assembly comprises an engine and an electric generator;
the engine, the electric generator, and the drive motor are located at the rear part of the vehicle frame;
an axis of the drive motor and the axis of the crankshaft are located above the drive shaft; and a vertical distance between an axis of an engine and an axis of the drive shaft is L1, and a vertical distance between the axis of the drive motor and the axis of the drive shaft is L2, L1 being greater than L2.

2. The hybrid all-terrain vehicle according to claim 1, wherein an axis of the drive motor is perpendicular to the longitudinal centrosymmetric plane.

3. The hybrid all-terrain vehicle according to claim 1, wherein the engine assembly is located on a front side of the drive motor.

4. The hybrid all-terrain vehicle according to claim 1, wherein the axis of the drive shaft is at an angle to the longitudinal centrosymmetric plane.

5. The hybrid all-terrain vehicle according to claim 1, wherein a gearbox is arranged between the drive motor and the drive shaft.

6. The hybrid all-terrain vehicle according to claim 1, wherein the longitudinal centrosymmetric plane passes through a middle part of at least one of the drive motor and a middle part of the engine assembly.

7. The hybrid all-terrain vehicle according to claim 1, wherein:
the electric generator comprises a generator shaft;
the crankshaft is arranged in the engine and is drivingly coupled to the generator shaft to drive the electric generator to generate electric energy; and
an axis of the generator shaft is parallel or perpendicular to the longitudinal centrosymmetric plane.

8. The hybrid all-terrain vehicle according to claim 1, wherein the hybrid all-terrain vehicle comprises a cockpit located in a middle part of the hybrid all-terrain vehicle, and the engine assembly and the drive motor are located in rear of the cockpit.

9. A hybrid all-terrain vehicle, comprising:
an engine and an electric generator being operatively coupled as an engine assembly;
a drive motor and a gearbox being operatively coupled as an electric drive assembly; and
a drive shaft extending along a front-rear direction of the vehicle frame and drivingly coupled to the drive motor,
wherein the engine assembly provides electric energy to the electric drive assembly; the engine, the electric generator, and the drive motor are located at a rear part of the hybrid all-terrain vehicle;
an axis of the drive motor and an axis of the engine are located above the drive shaft; and the axis of the drive motor is lower than the axis of the engine.

10. The hybrid all-terrain vehicle according to claim 9, wherein an axis of the drive motor is perpendicular to a longitudinal centrosymmetric plane of the hybrid all-terrain vehicle.

11. The hybrid all-terrain vehicle according to claim 10, wherein the longitudinal centrosymmetric plane passes through a middle part of at least one of the drive motor and a middle part of the engine assembly.

12. The hybrid all-terrain vehicle according to claim 10, wherein the electric generator comprises a generator shaft, and an axis of the generator shaft is parallel or perpendicular to the longitudinal centrosymmetric plane.

13. The hybrid all-terrain vehicle according to claim 9, wherein the engine assembly is located on a front side of the drive motor.

14. The hybrid all-terrain vehicle according to claim 9, wherein the drive shaft has an axis at an angle to a longitudinal centrosymmetric plane of the hybrid all-terrain vehicle.

15. The hybrid all-terrain vehicle according to claim 14, wherein the gearbox is arranged between the drive motor and the drive shaft.

16. The hybrid all-terrain vehicle according to claim 9, wherein the hybrid all-terrain vehicle comprises a cockpit located in a middle part of the hybrid all-terrain vehicle, and the engine assembly and the drive motor are located in rear of the cockpit.

\* \* \* \* \*